United States Patent [19]

Nelson

[11] 4,379,699

[45] Apr. 12, 1983

[54] METHOD OF AND MEANS FOR IMPROVED READING EFFICIENCY OF PERSONS WITH SPECIFIC DYSLEXIA

[76] Inventor: Eileen M. Nelson, 71 Cathryn Ct., Fox Lake, Ill. 60020

[21] Appl. No.: 193,754

[22] Filed: Oct. 3, 1980

[51] Int. Cl.³ .............................................. G09B 17/00
[52] U.S. Cl. .................................... 434/184; 351/239; 351/246
[58] Field of Search ................. 434/184, 178; 351/32, 351/33, 34, 35, 36, 37, 39; 101/398, 399; 40/584, 591

[56] References Cited

U.S. PATENT DOCUMENTS

| 1,629,256 | 5/1927 | Cohen | 273/303 |
| 3,419,985 | 1/1969 | Berrier | 40/591 |
| 3,571,951 | 3/1971 | Siegel et al. | 434/178 |
| 4,123,853 | 11/1978 | Dickensheet | 434/184 |

FOREIGN PATENT DOCUMENTS 6947 12/1878 Fed. Rep. of Germany ...... 434/178

Primary Examiner—William H. Grieb
Attorney, Agent, or Firm—Wood, Dalton, Phillips, Mason & Rowe

[57] ABSTRACT

A method of and structure for improving the reading efficiency of persons with specific dyslexia. The method of effecting such improvement includes providing to the dyslexiac reading material wherein the reading matter has a brightness substantially greater than that of the background on which the reading matter is provided. In the illustrated embodiment, the ratio of the brightness of the reading matter to the background is at least approximately 10 to 1. In a preferred form, the background is black and the reading matter is white. The treatment of the reading problem is advantageously adapted for increasing the reading speed of persons with specific dyslexia.

15 Claims, 3 Drawing Figures

METHOD OF AND MEANS FOR IMPROVED READING EFFICIENCY OF PERSONS WITH SPECIFIC DYSLEXIA

BACKGROUND OF THE INVENTION

1. Field of the Invention

This invention relates to the diagnosing and treating of reading problems in dyslexiacs and, in particular, to methods and means for increasing the reading efficiency of persons with specific dyslexia.

2. Description of the Background Art

Teaching persons with specific dyslexia to read with at least minimum efficiency is difficult and time consuming. Conventionally, such teaching has been done on a one-to-one basis with the dyslexiac and involves going over and over simple minimum reading material in an effort to build up the vocabulary and reading facility of the dyslexiac.

One method of assisting the dyslexiac in gaining reading efficiency is to utilize tactile print means in conjunction with visual reading matter.

Another method which has been employed has been to have the dyslexiac run his finger along a sandpaper marker adjacent the printed reading matter as an aid in strengthening and training the movements of his eyes in reading the reading matter.

SUMMARY OF THE INVENTION

The present invention comprehends an improved method of and means for increasing the reading efficiency of dyslexiacs wherein the dyslexiac is provided with reading material wherein the reading matter thereof has a brightness substantially greater than that of the background on which the reading matter is provided.

In the illustrated embodiment, the background is black and the reading matter is white.

In the preferred form, the ratio of brightness of the reading matter to the background is at least approximately 10 to 1.

The use of the dark background-light reading matter reading material has been found to improve the reading speed and compreshension of the dyslexiac to a substantial extent. As a result, increase in the reading vocabulary is substantially accelerated. It has been found that the improved reading efficiency may result not only from the improved ability to read the dark background-light reading matter, but also the improved reading efficiency may result from the increased vocabulary.

In further accelerating the teaching of the dyslexiac to read ordinary reading material, i.e. dark reading matter on light background, such reading material may be suitably juxtaposed to the therapeutic dark background-light reading matter reading material of the invention. Thus, the dyslexiac may readily practice reading the normal reading matter with the aid of the therapeutic reading material of the invention serving as a self-guide in such activity. In one form, the ordinary reading material is disposed in line-for-line adjacency to the therapeutic reading material of the invention so that the dyslexiac may read the therapeutic reading material and immediately thereafter merely shift his eyes such as downwardly to the adjacent corresponding normal reading material for immediately attempting reading thereof.

In another form, the therapeutic reading material may be provided as a complete multiline reading material with the normal reading material being provided as a corresponding multiline reading material selectively on the same page or on a subsequent page as desired.

The therapeutic reading material of the present invention may further incorporate learning reinforcement means by providing the therapeutic reading material in constantly increasing repetitive word formations. Thus, the initial therapeutic reading material may comprise a single word, a supplementary therapeutic reading material may comprise the same word with a second word used in combination therewith, etc.

While the invention is extremely simple and economical, it provides an unexpected, substantial improvement in the treatment of reading disability of dyslexiacs.

BRIEF DESCRIPTION OF THE DRAWING

Other features and advantages of the invention will be apparent from the following description taken in connection with the accompanying drawing wherein.

DESCRIPTION OF THE PREFERRED EMBODIMENTS

Figure 1:
FIG. 1 is a plan view of one form of reading material embodying the invention.

In the exemplary embodiment of the invention as disclosed in FIG. 1 of the drawing, reading material generally designated 10 is shown to comprise a support 11 carrying first reading matter 12 and similar, juxtaposed second reading matter 13. First reading matter 12 may comprise conventional reading matter wherein lettering 14 is superimposed on a light background 15. Illustratively, the lettering 14 may comprise black lettering on a white background 15.

Reading matter 13 preferably contains the same lettering as lettering 14 but wherein the lettering 16 thereof has a brightness substantially greater than the relatively dark background 17 of the reading material. In the illustrated embodiment, the lettering 16 is white and the background 17 is black.

Letters 16, in the illustrated embodiment, further comprise raised letters.

It has been unexpectedly found that the use of the light letters 16 with a substantially darker background 17 produce a highly therapeutic result in the treatment of reading problems of persons having specific dyslexia. More specifically, it has been found that the use of the light reading matter on a dark background has substantially increased the reading efficiency of such dyslexiacs.

By juxtaposing the improved reading material 13 to a conventional dark-on-light form of the reading material, the dyslexiac is afforded means for substantially improving his reading skill of conventional printed matter by virtue of having the more readable reading material 13 juxtaposed thereto.

The improvement in reading efficiency of dyslexiacs provided by the use of the reading material 13 has been found to be a direct function of the relative darkness of the background to the light lettering 16. Illustratively, it has been found that increased improvement occurs where the ratio of brightness of the light printed matter 16 to the dark background 17 is at least approximately 10 to 1.

It has further been found to be advantageous to provide the dark background as a nonreflecting background.

Thus, the dyslexiac may read the reading material 13 with improved efficiency and immediately read the same reading material 12 in the normal format of dark printing on a light background so as to practice reading the conventional printed matter form of reading material.

Additionally, by permitting the dyslexiac to read more efficiently as a result of the provision of the light-on-dark reading material 13, the vocabulary of the dyslexiac is improved so as to further improve the reading ability of normal printed matter.

It has further been found that by providing the therapeutic effects of the reading material 13, the dyslexiac is helped psychologically and, thus, tends to have further improved ability to read conventional reading material 12.

As indicated briefly above, the invention further comprehends the use of reinforcing word combinations in combination with the therapeutic use of the light-on-dark reading material. Thus, as illustrated in FIG. 1, the first presentation of the therapeutic material may be of a single word, such as the word "come" in reading materials 12 and 13. After the dyslexiac is found to be capable of reading the single word reading material, he is then presented with the double word reading material 13', which, as illustrated in FIG. 1, may be associated with the normal dark-on-light reading material 12', utilizing as the first word of the reading material of material 13' and 12' the word of reading material 13 and 12 in combination with a new word.

Similarly, after the dyslexiac becomes able to read the reading material 13' and 12', he may proceed to reading the reading material 13" and 12" wherein a further word is added.

The reinforcing repetitive use of the previously learned reading material has been found to further facilitate the increasing reading ability of such persons suffering from specific dyslexia.

Figure 2:
FIG. 2 is a plan view of another form of reading material embodying the invention.
Figure 3:
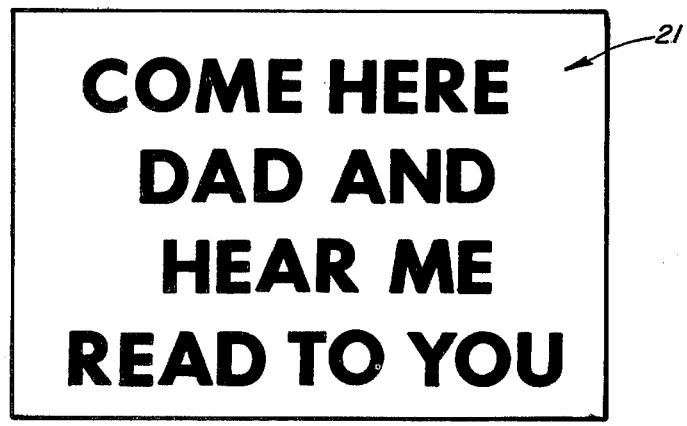
FIG. 3 is a plan view of a conventional form of reading material to be used with the reading material of FIG. 2 in picturing the invention.

The invention further comprehends the provision of the improved reading material 13 independently of the presentation of the same material in conventional form, such as reading material 12. Thus, as shown in FIG. 2, the reading material generally designated 18 comprises light letter 19 on a relatively dark background 20 as the sole reading material of the page. The use of reading material 18 has been found advantageous independently of the juxtaposed conventional reading material of the embodiment of FIG. 1.

It has further been found to be advantageous in certain instances to provide the reading material 13, 18 with the lettering 16, 19 thereof as raised letters. Where the lettering 16, 19 comprises such raised letters, the dyslexiac may receive further enhancement of his reading efficiency by running his fingers along the raised letters, while at the same time visually perceiving the improved arrangement of the light lettering on the dark background.

In the preferred use of the invention, the dyslexiac is treated for his reading efficiency problem by means of the use of the light on dark reading material 13. To prevent the continued reliance on the use of such therapeutic reading material and permit the dyslexiac to transfer to the reading of conventional dark-on-light reading material, the embodiment of FIG. 1 offers facilitated training in such normal reading skills. In certain instances, however, the all light-on-dark background reading material 18 may be utilized, and further utilized with normal dark-on-light reading material 21, as discussed above. While, in FIG. 1, the reinforcing arrangement of the repetition of the previously learned words in the new therapeutic reading material to be presented to the dyslexiac is carried on a single page, it will be obvious to those skilled in the art that the invention further comprehends the provision of the successive word supplemented reading materials on separate pages, as in the reading materials 18 and 21 discussed above.

Where the reading disability is extremely profound, the therapeutic material may comprise single word reading material, such as reading material 13, 12, as discussed above. Where the dyslexiac has some improved reading ability, the reading material provided to him may comprise reading material such as reading material 13" and 12" wherein combinations of words are presented. Obviously, the particular illustrative embodiments of the therapeutic material discussed above are exemplary only, the specific word usage in the therapeutic material being suited more specifically to the person being treated, as determined by the teacher.

The invention comprehends the improved method of diagnosing and treating reading problems of such dyslexiacs wherein the reading efficiency of the person being tested is firstly determined. In the event the reading efficiency is determined to be lower than a preselected normal reading efficiency, the cause of the low reading efficiency is determined. If the cause is found to be a neurological cause and the person is suffering from specific dyslexia, the improved therapeutic reading material having the light lettering on dark background is provided.

If it is determined that the reading efficiency of the dyslexiac is increased in reading the light-on-dark background reading material, the use of such light-on-dark reading material is prescribed for continued therapeutic treatment.

The particular form of the therapeutic material to be utilized in teaching the dyslexiac may be readily determined by providing the simplest form thereof, such as that illustrated in FIG. 1 initially to the dyslexiac. As the dyslexiac's reading ability increases as a result of the use of the therapeutic reading material of the present invention, greater length word combinations and more difficult words may be provided. The use of the therapeutic material of the present invention has been found to expedite an increase in the reading ability and, thus, the ability to read more complicated material, such as that of reading materials 18 and 21, has, in many cases been quickly reached from an initial reading ability wherein the reading of a single word reading material, such as reading material 12, was extremely difficult.

As will be obvious to those skilled in the art, the use of the all light-on-dark reading material 18 may be, to some extent, simulated to the use of the reading material 10 of FIG. 1 by providing alternate or subsequent pages containing the same reading matter but in a dark-on-light format, such as interleaved with pages of the reading material 18 or following a complete presentation of a number of pages of reading material 18. Thus, the dyslexiac could read one or more pages of the light-on-dark reading material 18 and then immediately attempt to read the same material in the also-provided conventional dark-on-light reading material pages.

Thus, the invention comprehends not only providing therapeutic reading material in the form of light printed matter on dark background, but also in correlating that reading material with the conventional dark printed matter on light background reading material so as to treat the dyslexiac's reading efficiency problem and by means of the improved therapeutic reading material of the present invention, facilitate the training of the dyslexiac to read conventional reading material.

The foregoing disclosure of specific embodiments is illustrative of the broad inventive concepts comprehended by the invention.

I claim:

1. The method of increasing the reading efficiency of a dyslexiac suffering from specific dyslexia, comprising providing to such dyslexiac reading material wherein the reading matter comprises a first line of lettering having a brightness substantially less than that of the background on which the lettering is provided, and a second line of similar reading matter adjacent said first line and having a second line of lettering having a brightness substantially greater than that of the background on which the second line of lettering is provided.

2. The method of increasing the reading efficiency of a dyslexiac of claim 1 wherein said first line is disposed subjacent said second line.

3. The method of increasing the reading efficiency of a dyslexiac of claim 1 wherein said second line of reading matter comprises white lettering on a black background.

4. The method of increasing the reading efficiency of a dyslexiac suffering from specific dyslexia, comprising providing to such dyslexiac first reading material wherein the lettering is solely forwardly readable and has a brightness substantially greater than that of the background on which the reading matter lettering is provided and further providing to the dyslexiac additional reading material wherein the reading matter comprises a combination of said first reading matter with additional forwardly readable reading matter, said additional reading matter having a brightness substantially less than that of the background on which the reading matter is provided.

5. Therapeutic reading material comprising:
means for presenting a dark background; and
reading matter lettering superimposed on said dark background and having a brightness substantially greater than that of said background for causing the efficiency of reading said reading matter by a dyslexiac to be greater than the efficiency of reading by the dyslexiac of conventional reading material wherein the brightness of the lettering is less than that of the background, said reading material further including second reading matter disposed adjacent said first named reading matter in line-for-line correspondence therewith, said second reading matter lettering being dark and being superimposed on a light background having a brightness substantially greater than that of the second reading matter lettering.

6. The therapeutic reading material of claim 5 wherein said background is black.

7. The therapeutic reading material of claim 5 wherein said reading matter is defined by white lettering.

8. The therapeutic reading material of claim 5 wherein said background defines a nonreflecting surface.

9. The therapeutic reading material of claim 5 wherein said second reading matter is disposed directly above the respective lines of said first named reading matter.

10. The therapeutic reading material of claim 5 wherein said second reading matter comprises raised letters.

11. Therapeutic reading material comprising:
first means for presenting a dark background;
first reading matter lettering superimposed on said dark background and having a brightness substantially greater than that of said background, said first reading matter comprising a first portion of a sentence structure;
second means for presenting a second dark background spaced from said first named background; and
second reading matter lettering superimposed on said second dark background having a brightness substantially greater than that of said background, said second reading matter comprising a combination of said first reading matter and additional reading matter comprising a second, continuation portion of said sentence structure.

12. The therapeutic reading material of claim 11 wherein each said background is black.

13. The therapeutic reading material of claim 11 wherein each said reading matter lettering is defined by white lettering.

14. The therapeutic reading material of claim 11 further including third means for presenting a third dark background, and third reading matter lettering superimposed on said third dark background having a brightness substantially greater than that of said background, said third reading matter comprising a combination of said second reading matter and additional reading matter comprising a third, continuation portion of said sentence structure.

15. Therapeutic reading material comprising:
first means for presenting a dark background;
first reading matter lettering superimposed on said dark background and having a brightness substantially greater than that of said background;
second means for presenting a second dark background spaced from said first named background; and
second reading matter lettering superimposed on said second dark background having a brightness substantially greater than that of said background, said second reading matter comprising a combination of said first reading matter and additional reading matter, said first and second reading matter lettering comprising raised letters.

* * * * *